(12) United States Patent
Ota et al.

(10) Patent No.: US 6,932,422 B2
(45) Date of Patent: Aug. 23, 2005

(54) ATTACHMENT STRUCTURE OF WEATHER STRIP FOR MOTOR VEHICLE

(75) Inventors: Tomoki Ota, Aichi-ken (JP); Yoshinobu Yamada, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/764,603

(22) Filed: Jan. 27, 2004

(65) Prior Publication Data

US 2004/0227380 A1 Nov. 18, 2004

(30) Foreign Application Priority Data

Jan. 31, 2003 (JP) ........................................ 2003-023241
Jan. 31, 2003 (JP) ........................................ 2003-023249

(51) Int. Cl.[7] ............................................... B60J 10/12
(52) U.S. Cl. ................................................. 296/216.07
(58) Field of Search ........................ 296/216.06–216.09

(56) References Cited

U.S. PATENT DOCUMENTS 5,538,317 A * 7/1996 Brocke et al. ......... 296/216.09
5,553,913 A * 9/1996 Nabuurs ................ 296/216.09
6,517,150 B2 * 2/2003 De Gaillard et al. ... 296/216.06

FOREIGN PATENT DOCUMENTS

JP    A-H08-58392     3/1996
JP    A-H08-276750    10/1996
JP    A-2001-301470   10/2001

* cited by examiner

*Primary Examiner*—Dennis H. Pedder
(74) *Attorney, Agent, or Firm*—Posz Law Group, PLC

(57) ABSTRACT

An attachment structure of a weather strip having a base portion and a tubular seal portion to an opening portion of a motor vehicle or a periphery of a closing member for opening and closing the opening portion. The attachment structure includes a channel part having a U-shaped cross-section and including side walls provided in the opening portion of the motor vehicle or the periphery of the closing member to define a channel. The base portion of the weather strip includes an inserting part adapted to be inserted in the channel and a holding part for holding one of the side walls with the inserting part. The inserting part and the holding part define a slot. The inserting part includes a holding lip which projects from an end of the inserting part obliquely outward. The one side wall is inserted in the slot of the base portion, and the inserting part of the base portion is inserted in the channel such that the holding part holds the one side wall with the inserting part, and the holding lip of the inserting part elastically contacts the other side wall defining the channel.

7 Claims, 6 Drawing Sheets

ATTACHMENT STRUCTURE OF WEATHER STRIP FOR MOTOR VEHICLE

CROSS-REFERENCE TO RELATED APPLICATION

This application is related to and claims priority from Japanese patent applications No. 2003-023241 and 2003-023249, incorporated herein by reference.

BACKGROUND OF THE INVENTION

1. Field of the Invention

The present invention relates to an attachment structure for attaching a weather strip to an opening portion of a motor vehicle, or a closing member for opening and closing the opening portion, thereby providing a seal between the opening portion and the closing member.

2. Description of Related Art

Weather strips are attached to opening portions of motor vehicles, or closing members for opening and closing the opening portions, such as side doors, sliding roofs, trunk lids, etc, to provide a seal between the opening portions and the closing members.

Several examples of the conventional attachment structures for attaching such weather strips will be explained with reference to FIGS. 1 through 4.

FIG. 1 illustrates a roof of a motor vehicle, which is provided with a sliding roof 10 for opening and closing a roof opening formed in a roof panel 12, and FIGS. 2 through 4 illustrate conventional roof panel weather strips for sealing between a periphery of the sliding roof 10 and an opening portion 14 of the roof panel 12, each being a cross-section taken along the line of A—A of FIG. 1.

FIG. 2 shows a roof panel weather strip 16 including a base portion 18 as a trim having a U-shaped cross-section, and a tubular seal portion 20 integrally formed with the base portion 18.

A resin moulding 22 is attached to a periphery of the sliding roof 10. A hook-shaped end of the resin moulding 22 is inserted in the base portion 18 to attach the roof panel weather strip 16 to the sliding roof 10. A metal insert 24 is embedded in the base portion 18 to increase the holding force against the hook-shaped end of the resin moulding 22.

When the sliding roof 10 is closed, the tubular seal portion 20 of the roof panel weather strip 16 contacts and presses the opening portion 14 to provide a seal between the periphery of the sliding roof 10 and the opening portion 14 of the roof panel 12 (Publication of unexamined patent application No. Hei 8-276750, ex.).

This conventional structure, however, has the problem that the metal insert 24 embedded in the base portion 18 increases the weight of the roof panel weather strip 16, thereby increasing the weight of a vehicle body. In addition, since the holding lips project from inside surfaces of the base portion 18, the base portion 18 is difficult to form compact.

FIG. 3 shows another roof panel weather strip 26 including a base portion 28 having a U-shaped cross-section, and a tubular seal portion 30 integrally formed with the base portion 28.

A resin moulding 32 is attached to a periphery of the sliding roof 10, and the base portion 28 is bonded to the resin moulding 32 with a double-sided adhesive tape 34 to bond the roof panel weather strip 26 to the sliding roof 10 (Publication of unexamined patent application No. 2001-301470, ex.).

This conventional structure, however, has the problem that the double-sided adhesive tape 34 which is expensive increases the production costs of the roof panel weather strip 26. In addition, the bonding step of the double-sided adhesive tape 34 in position is further needed, thereby increasing labor and time for attaching the roof panel weather strip 26 to the sliding roof 10.

FIG. 4 shows still another conventional roof panel weather strip 36 including a base portion 38 and a tubular seal portion 40 integrally formed with the base portion 38. The base portion 38 of the roof panel weather strip 36 is attached to a periphery of the sliding roof 10 by inserting a flange 42 of a metal frame 44 secured to the sliding roof 10 in a slot 46 provided in the base portion 38. The base portion 38 has a seal lip 48 for sealing a periphery of the sliding roof 10 (Publication of unexamined patent application No. Hei 8-58392, ex.).

This conventional structure, however, has the problem that the seal lip 48 does not serve to prevent tilting of the base portion 38 relative to the sliding roof 10. In addition, the base portion 38 does not closely contact the flange 42 of the metal frame 44 so as not to increase the holding force of the base portion 38 against the metal frame 44, whereby the base portion 38 may not be stably attached to the sliding roof 10.

SUMMARY OF THE INVENTION

Accordingly, it is an object of the present invention to provide an attachment structure of a weather strip for sealing between an opening portion of a motor vehicle and a closing member for opening and closing the opening portion, such as a side door, a sliding roof, a trunk lid, etc, which ensures the weather strip to be readily and stably attached to the motor vehicle.

The attachment structure of a weather strip in accordance with the present invention includes a channel for attaching a base portion of the weather strip therein, which is defined by walls having a U-shaped cross-section and provided in one of the opening portion of the motor vehicle, and a periphery of a closing member. The weather strip includes the base portion composed of a solid material and a tubular seal portion composed of a sponge material. The base portion has a generally U-shaped cross-section and defines a slot for inserting one side wall defining the channel therein. The base portion includes an inserting part which is adapted to be inserted in the channel, and a holding part for holding the one side wall defining the channel with the inserting part inserted in the channel. The inserting part includes a holding lip which projects from an end of the inserting part obliquely outward. The tubular seal portion protrudes from the base portion integrally therewith, The one side wall defining the channel is inserted in the slot of the base portion, and the inserting part of the base portion is inserted in the channel with the holding lip elastically contacting the other side wall defining the channel, whereby the weather strip is attached to the opening portion of the motor vehicle or the periphery of the closing member for opening and closing the opening portion.

With the attachment structure of the present invention, since the base portion of the weather strip is composed of a solid material such as a solid rubber, solid thermoplastic elastomer, etc, the base portion exhibits high rigidity, and accordingly, can be sufficiently attached to the opening portion, etc. without a metal insert embedded therein. And since the tubular seal portion of the weather strip is composed of a sponge material such as a sponge rubber, sponge thermoplastic elastomer, etc., the tubular seal portion exhibits high flexibility, and accordingly, contacts a facing member elastically irrespective of the variation in the lap between the tubular seal portion and the facing member, thereby exerting a sufficient pressing force and a stable sealing force against the facing member.

Since the inserting part of the base portion can be inserted in the channel with the holding lip elastically contacting the other side wall defining the channel, and one side wall defining the channel can be inserted in the slot provided in the base portion, the base portion can be attached to the opening portion of the motor vehicle or the periphery of the closing member for opening and closing the opening portion using the slot provided in the base portion, and the channel provided in the opening portion or the closing member.

And the holding part and the inserting part of the base portion can hold the one side wall defining the channel, thereby ensuring a stable holding of the base portion on the opening portion, etc.

In addition, since the inserting part includes a holding lip at an end thereof, the holding lip flexibly contacts the other side wall defining the channel, thereby facilitating the insertion of the base portion in the channel, and making the inserted base portion difficult to come off the channel. And since the holding lip presses the inserting part of the base portion on the one side wall, thereby enabling the attachment of the base portion to the opening portion, etc. with a sufficient holding force.

Furthermore, since the tubular seal portion protrudes from the base portion integrally therewith, the tubular seal portion does not deform due to the stable attachment of the base portion to the opening portion, and accordingly, contacts a facing surface of a closing member, etc. in a direction approximately perpendicular thereto, thereby effecting a stable sealing force against the closing member, etc. And since the tubular seal portion is hollow, it exhibits elasticity, and effects a nearly identical sealing force irrespective of the variation in the lap between the tubular seal portion and the facing surface.

In a preferred embodiment of the present invention, the weather strip is a roof panel weather strip for sealing between a sliding roof provided in a roof panel, and an opening portion of the roof panel. The tubular seal portion protrudes from the holding part of the base portion of the roof panel weather strip toward the sliding roof, and, when the sliding roof is closed, contacts a periphery of the sliding roof. A frame member is provided in the opening portion of the roof panel for attaching the roof panel weather strip thereto. The frame member includes a base part for securing the frame member to the opening portion, and a channel part having a U-shaped cross-section for inserting the inserting part of the roof panel weather strip therein. The roof panel weather strip is attached such that one side wall of the channel part is inserted in the slot of the base portion and an end of the holding lip elastically contacts an inner surface of the other side wall of the channel part.

With this arrangement, since the frame member can be manufactured separately from the opening portion of the roof panel, the frame member can be readily produced, and can be secured to the opening portion of the roof panel after the roof panel weather strip is mounted on the frame member, thereby facilitating the attachment of the roof panel weather strip to the opening portion.

In another preferred embodiment, the inserting part of the base portion is provided with a projection which projects from an upper part of an outside surface thereof, and the holding part of the base portion is provided with a protrusion which protrudes from an end thereof.

With this arrangement, the projection provided in the inserting part elastically contacts the other side wall defining the channel as well as the holding lip provided in the inserting part, thereby holding the inserting part in the channel stably. In addition, the protrusion provided in the holding part engages with an outer surface of a bottom wall defining the channel when the inserting part comes loose in the channel, thereby preventing the weather strip from coming off the channel.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, the attachment structure of a roof panel weather strip for sealing between a sliding roof and an opening portion of a roof panel of a motor vehicle will be explained as one example of the attachment structure of the present invention. The attachment structure in accordance with the present invention is also applicable to the weather strip for sealing between a side door or a trunk lid and a facing opening portion, etc.

Figure 1:
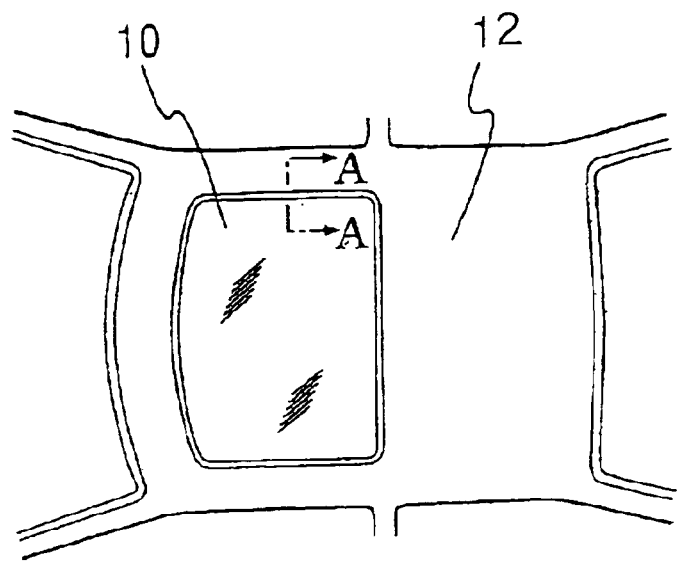
FIG. 1 is a plan view of a roof of a motor vehicle.
Figure 2:
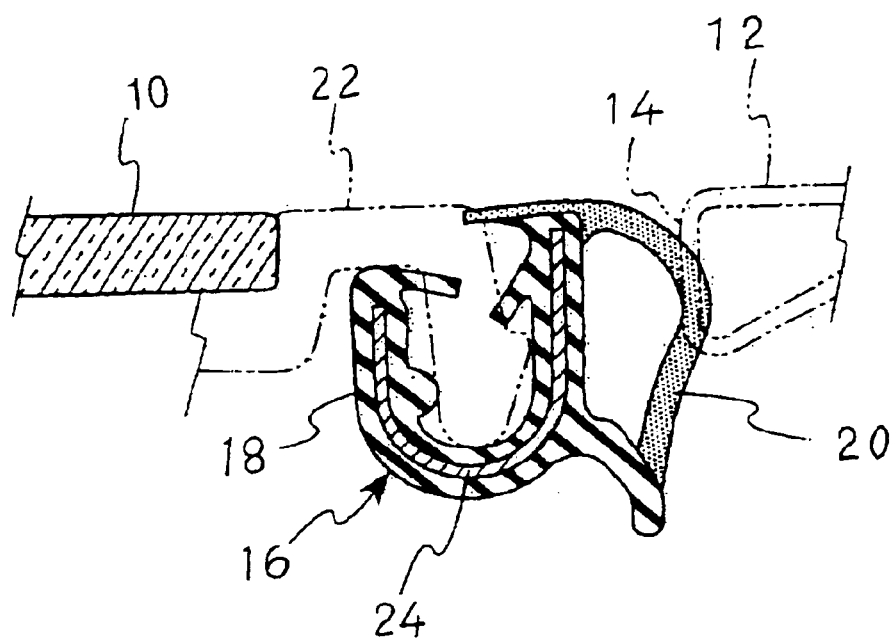
FIG. 2 is a partially cut-away cross-sectional view of one example of a conventional attachment structure of a weather strip, which is taken along the line A—A of FIG. 1.
Figure 3:
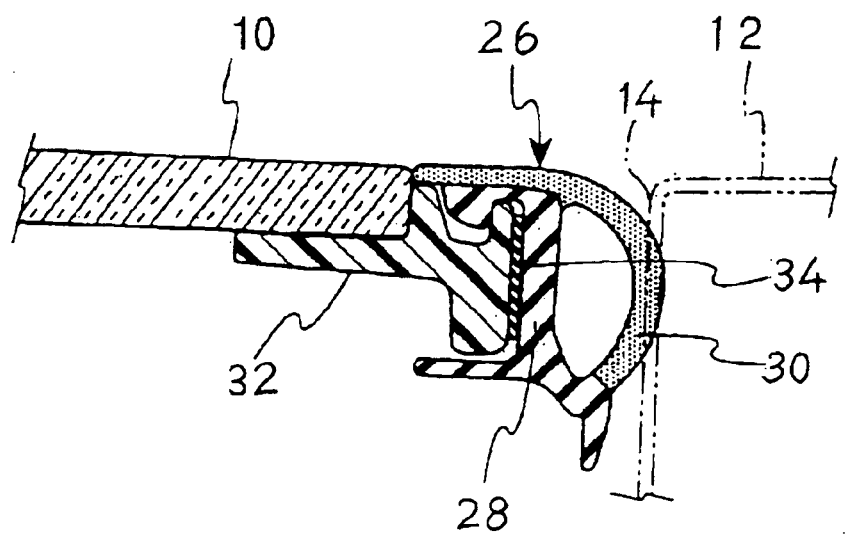
FIG. 3 is a partially cut-away cross-sectional view of another example of a conventional attachment structure of a weather strip, which is taken along the line A—A of FIG. 1.
Figure 4:
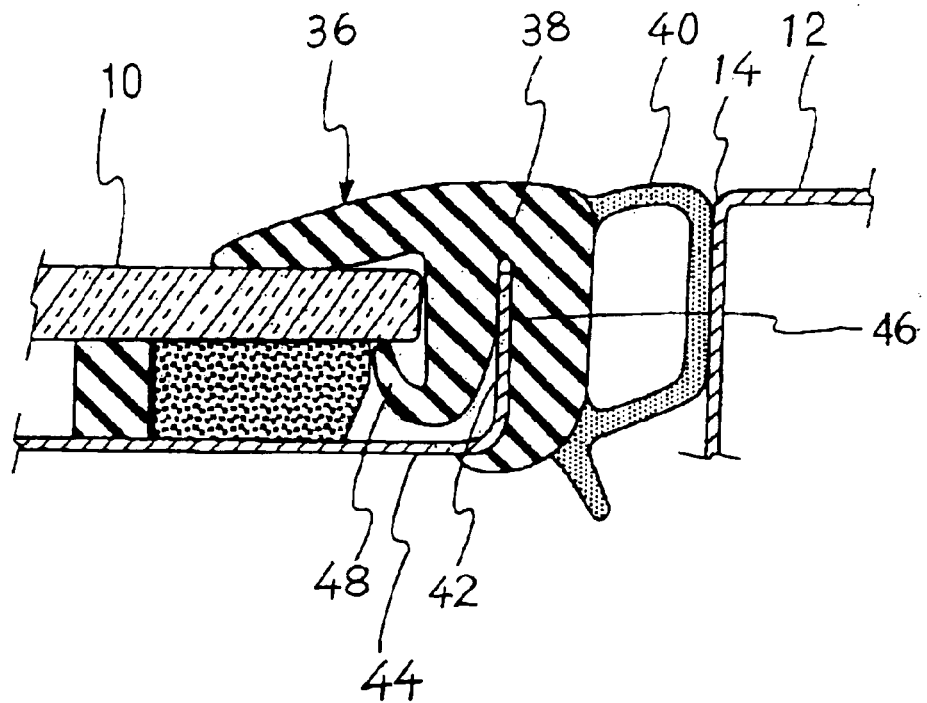
FIG. 4 is a partially cut-away cross-sectional view of a still another example of a conventional attachment structure of a weather strip, which is taken along the line A—A of FIG. 1.
Figure 5:
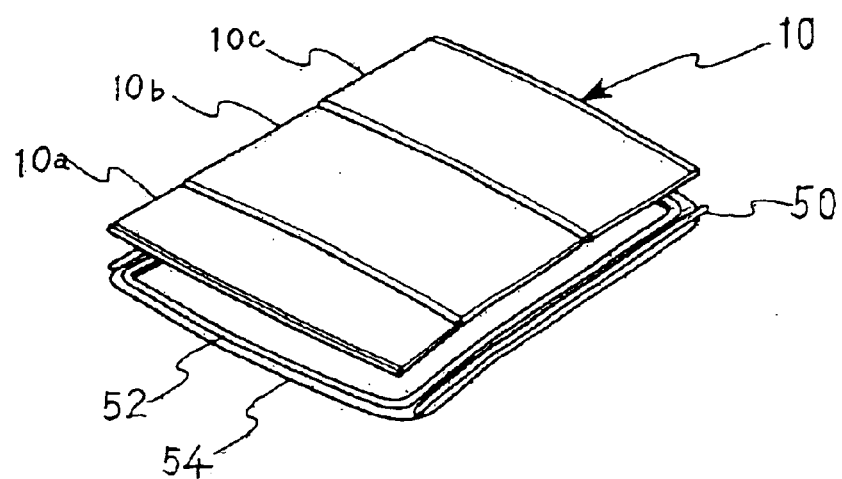
FIG. 5 is a perspective view of a sliding roof in a closed state, along with a frame member to which weather strips are attached in one embodiment of an attachment structure in accordance with a present invention.

As shown in FIG. 5, the roof panel weather strip includes a first weather strip 50 and a second weather strip 52, and these weather strips 50 and 52 are attached to a frame member 54 having a four-sided configuration, which is secured to the opening portion of the roof panel 12 (FIG. 1). And a sliding roof 10 for closing and opening a roof opening of the roof panel 12 is mounted above the first weather strip 50 and the second weather strip 52.

The second weather strip 52 has an annular four-sided configuration, and seals around a periphery of the sliding roof 10 having a rectangular configuration. The first weather strip 50 has a straight line-shaped configuration, and is attached outside a longitudinal side of the second weather strip 52 in parallel with each other, thereby sealing a side edge of the sliding roof 10.

The sliding roof 10 is composed of three sliding roofs in the present embodiment. Alternatively, the sliding roof 10 may be composed of a single sliding roof. It is preferable to form the sliding roof 10 of a glass panel or a transparent synthetic resin panel for effecting excellent lighting properties, and improving the designing properties of the sliding roof 10.

In FIG. 5, the sliding roof 10 is composed of a first sliding roof 10a, a second sliding roof 10b and a third sliding roof 10c which are arranged longitudinally of a vehicle body.

The first sliding roof 10a is mounted so as to tilt up and down about a front edge thereof while each of the second and third sliding roofs 10b and 10c is mounted so as to tilt up and down about a front edge thereof and slide longitudinally of the vehicle body.

Figure 6:
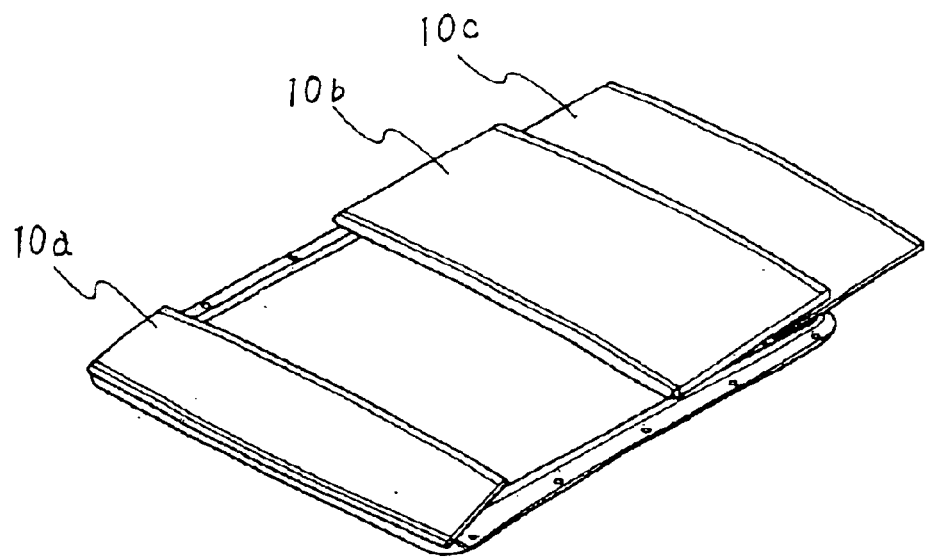
FIG. 6 is a perspective view of a sliding roof in an open state in one embodiment of the attachment structure in accordance with the present invention.

To open the sliding roof 10 thus arranged, the first sliding roof 10a is tilted up about the front edge thereof by a driving device (not shown) to lift a rear part thereof. Then, the second and third sliding roofs 10b and 10c are respectively tilted up about the front edge thereof to lift a rear part thereof, and also slid rearward. And the second sliding roof 10b is further slid rearward to the position above the third sliding roof 10c, whereby, as shown in FIG. 6, the second and third sliding roofs 10b and 10c overlap each other to open the roof opening to its maximum without the sling roof 10 greatly projecting rearward.

To close the sliding roof 10, the second and third sliding roofs 10b and 10c are respectively slid frontward, and tilted down about the front edge thereof to lower the rear part thereof. Then, the first sliding roof 10a is tilted down about the front edge thereof to lower the rear part thereof. Consequently, the sliding roof 10 contacts and presses the first weather strip 50 and the second weather strip 52 to seal between the sliding roof 10 and the opening portion 14.

Figure 7:
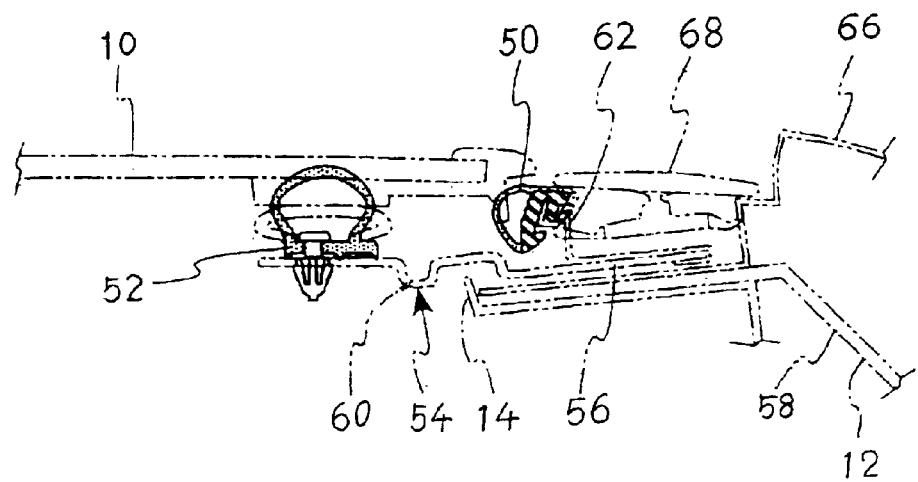
FIG. 7 is a cross-sectional view of one embodiment of the present invention, which is taken along the line A—A of FIG. 1.

FIG. 7 shows a cross-sectional view of a side part of the roof panel 12 when the sliding roof 10 is closed. As shown, the first weather strips 50 and the second weather strip 52 provide double sealing along a side edge of the sliding roof 10.

The frame member 54 includes a base part 56 to be secured to an inner panel 58 of the roof panel 12, a protruding part 60 which protrudes from the base part 56 into the roof opening for mounting the second weather strip 52 thereon, a vertical part 62 which extends from the base part 56 vertically upward, and a channel part 64 (FIG. 8) having a U-shaped cross-section which defines a channel along an upper end of the vertical part 62 for attaching the first weather strip 50. Reference numeral 66 denotes an outer panel of the roof panel 12, and reference numeral 68 denotes a roof moulding.

Figure 8:
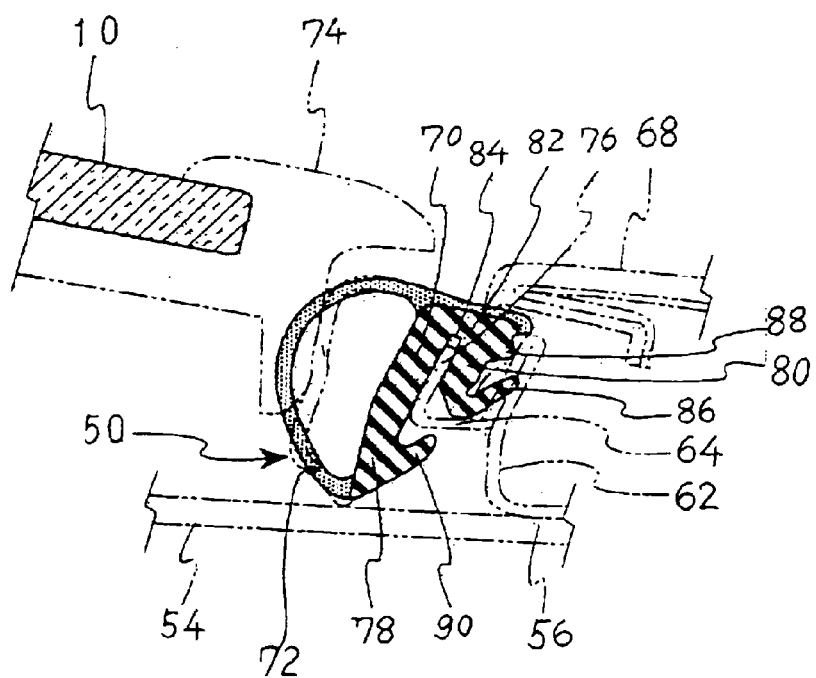
FIG. 8 is a cross-sectional view of a first weather strip in one embodiment of an attachment structure in accordance with the present invention.

Next, the first weather strip 50 will be explained in detail. FIG. 8 is a cross-sectional view of the first weather strip 50, which is taken along the line A—A of FIG. 1.

As shown, the first weather strip 50 includes a base portion 70 attached in the channel part 64 of the frame member 54, and a tubular seal portion 72 for contatcting and pressing a resin moulding 74 provided along a side edge of the sliding roof 10.

The base portion 70 is composed of a solid rubber, and the tubular seal portion 72 is composed of a sponge rubber. The base portion 70 and the tubular seal portion 72 are formed by extruding synthetic rubbers such as EPDM rubbers. The tubular seal portion 72 extends and covers an upper surface of the base portion 70 to conceal a joint between the solid rubber and the sponge rubber, thereby improving the appearance around the sliding roof 10.

The base portion 70 has a U-shaped cross-section, and includes a holding part 78, an inserting part 80 and an upper wall 82 to define a slot 84. The inserting part 80 is provided with a holding lip 86 along an end thereof so as to extend obliquely upward and outward. The inserting part 80 is further provided with a projection 88 on an outside surface thereof near the upper wall 82.

To attach the first weather strip 50 to the frame member 54, the inside wall 76 of the frame member 54 is inserted in the slot 84 of the base portion 70. At this time, the inserting part 80 of the base portion 70 is inserted in the channel part 64 of the frame member 54, and the holding lip 86 provided along the end of the inserting part 80 contacts an outside wall of the channel part 64, that is the wall opposite to the inside wall 76, and bends to be pressed on the inserting part 80 just under the projection 88 provided in the inserting part 80 in flush with or slightly inwardly of the projection 88, thereby facilitating the insertion of the inserting part 80 in the channel part 64.

When the inserting part 80 is inserted in the channel 64, the holding lip 86 and the projection 88 elastically contact the outside wall of the channel part 64, thereby holding the inserting part 80, and pressing the inserting part 80 on the inside wall 76 along two lines. Consequently, the inside wall 76 of the channel part 64 can be held by the holding part 78 and the inserting part 80 with a sufficient holding force, whereby the first weather strip 50 can be securely held by the frame member 54.

In addition, the base portion 70 of a solid rubber exhibits high rigidity so that the base portion 70 can be securely attached to the frame member 54. Accordingly, it is unnecessary to embed a metal insert or the like in the base portion 70.

The holding part 78 of the base portion 70 has a protrusion 90 which protrudes obliquely upward from a lower end thereof. When the inserting part 80 of the base portion 70 becomes loose in the channel part 64, the protrusion 90 engages with a bottom wall of the channel part 64 to prevent the first weather strip 50 from coming off the channel 64.

In addition, to prevent the first weather strip 50 from coming loose relative to the frame member 54 in the longitudinal direction thereof, and enable more stable attachment of the first weather strip 50 to the frame member 54, a longitudinal end thereof may be secured to the frame member 54.

Figure 9:
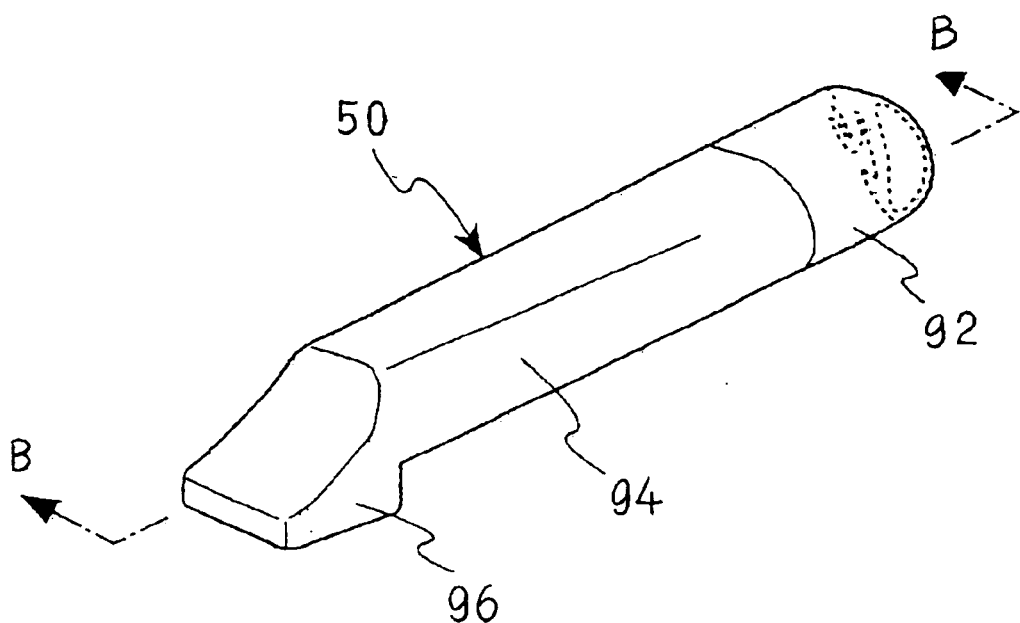
FIG. 9 is a perspective view of an upper side of a longitudinal end part of a first weather strip in one embodiment of an attachment structure in accordance with the present invention.
Figure 10:
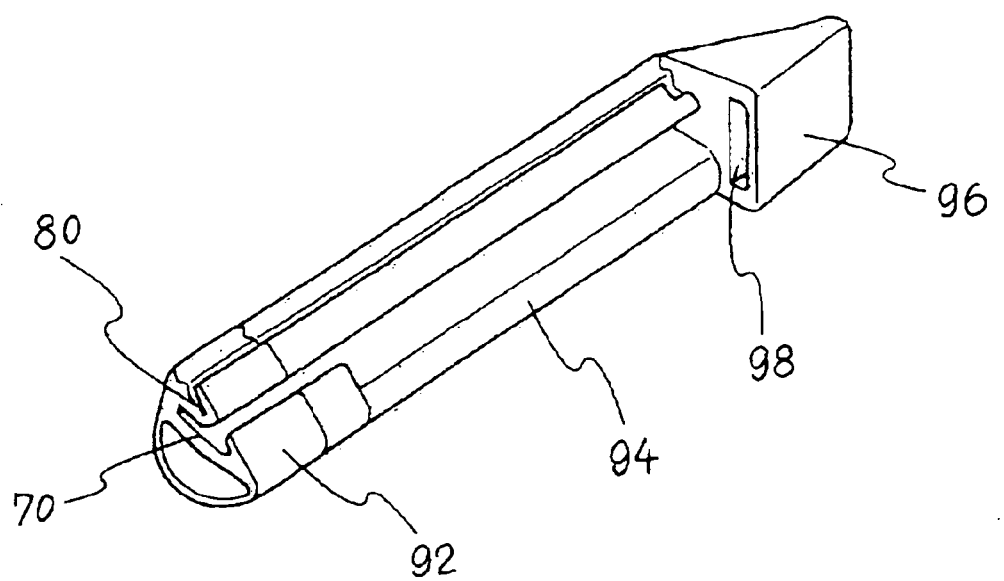
FIG. 10 a perspective view of a bottom side of a longitudinal end part of a first weather strip in one embodiment of an attachment structure in accordance with the present invention.
Figure 11:
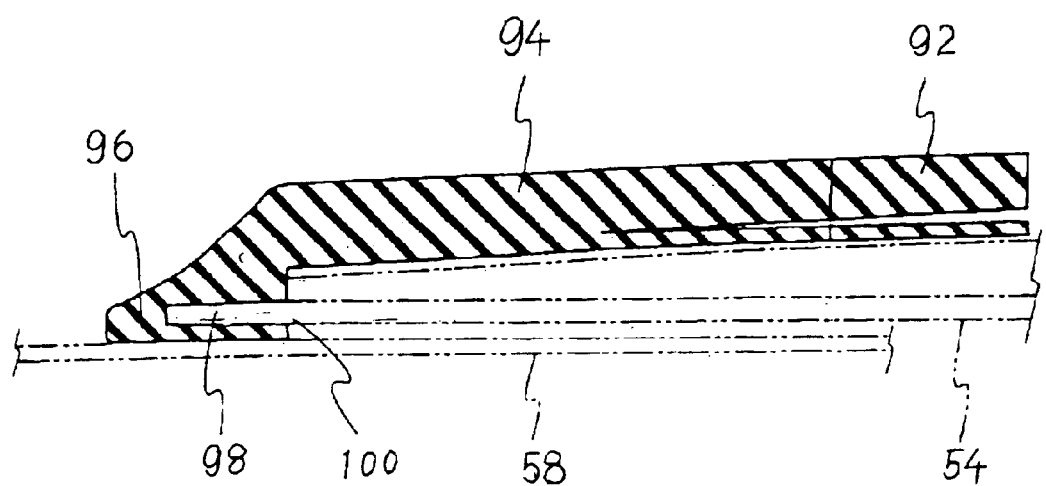
FIG. 11 is a longitudinal sectional view of a longitudinal end part of a first weather strip in one embodiment of an attachment structure in accordance with the present invention, taken along the line B—B of FIG. 9.

As shown in FIGS. 9 through 11, the first weather strip 50 includes a main part 92 and a longitudinal end part 94. As shown in FIG. 9, the cross-sectional shape of the longitudinal end part 94 is nearly identical to that of the main part 92 in the vicinity of a joint between the end part 94 and the main part 92. At an end 96 of the longitudinal end part 94, an upper surface thereof is tapered to have a generally triangular section.

As shown in FIG. 10, a bottom surface of the end 96 of the longitudinal end part 94 is formed flat in flush with a bottom surface of the base portion 70 of the main part 92. An inserting slot 98 is provided in the end 96 for inserting a projecting part 100 (FIG. 11) of the frame member 54 therein. As shown in FIG. 11, the inserting slot 98 extends in the longitudinal direction of the longitudinal end part 94 toward the vicinity of the end thereof. In the attached state of the weather strip 50, the bottom surface of the end 96 of the longitudinal end part 94 contacts the inner panel 58 of the roof panel 12, and the projecting end 100 of the frame member 54 is inserted in the inserting slot 98. Consequently, the end 96 of the longitudinal end part 94 is sandwiched between and held by the inner panel 58 of the roof panel 12 and the frame member 54, thereby preventing the first weather strip 50 from coming loose relative to the roof panel 12, when the sliding roof 10 moves to exert such a force as to deform the first weather strip 50, whereby the weather strip 50 can be securely attached to the opening portion 14.

The projecting end 100 of the frame member 54 is provided at each of front corners of the four-sided frame member 54 so as to face the longitudinal end part 94 of the first weather strip 50.

The longitudinal end part 94 of a solid material exhibits high rigidity. By holding the end 96 of the longitudinal end part 94 with the projecting end 100 of the frame member 54, the entire portion of the end part 94 is held and is securely attached to the frame member 54.

The tubular seal portion 72 of the first weather strip 50 is provided inside the base portion 70. When the sliding roof 10 is closed, the moulding 74 attached to a periphery thereof contacts the tubular seal portion 72 and seals between the sliding roof 10 and the opening portion 14 of the roof panel 12. The tubular seal portion 72 composed of a sponge rubber exhibits flexibility, and accordingly, readily absorbs the variation in the relative position between the moulding 74 and the tubular seal portion 72.

In addition, since the base portion 70 can be mounted on the frame member 54 securely, the tubular seal portion 72 contacts and presses a facing surface of the moulding 74 in a direction nearly perpendicular thereto without generating any deformation thereof, thereby exhibiting excellent sealing properties.

Consequently, the first weather strip 50 and the second weather strip 52 provide a double seal along both sides of a vehicle body, thereby preventing rainwater, etc. from intruding into a vehicle compartment, and accordingly improving the sealing properties. Rainwater, etc. leaked between the first weather strip 50 and the facing surface of the moulding 74 enters a drain provided in the protruding part 60 of the frame member 54, and is discharged outside the vehicle body. Accordingly, no drip channel is needed under the first weather strip 50 so that the structure of the roof panel 12 can be made compact.

The roof moulding 68 provided between the outer panel 66 of the roof panel 12 and the first weather strip 50 covers a gap therebetween to improve the appearance around the first weather strip 50.

In accordance with the present invention, since the base portion of the weather strip can be attached using the channel part provided in the opening portion of the roof panel, etc., the weather strip can be stably attached to the opening portion, etc., and a compact attachment structure with sufficient sealing properties can be effected. In addition, a lightweight weather strip can be produced at low costs.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. An attachment structure of a weather strip for a motor vehicle, which is to be attached to one of an opening portion of a motor vehicle, and a periphery of a closing member for opening and closing the opening portion, wherein the weather strip includes a base portion composed of a solid material and a tubular seal portion composed of a sponge material, and protruding from said base portion integrally therewith, the attachment structure comprising:

a channel part in which said base portion of the weather strip is adapted to be attached, said channel part having a U-shaped cross-section and including side walls provided in one of said opening portion of said motor vehicle, and said periphery of said closing member, thereby defining a channel;

said base portion of the weather strip having a generally U-shaped cross-section to define a slot in which one of said side walls defining said channel is adapted to be inserted, said base portion including an inserting part which is adapted to be inserted in said channel, and a holding part for holding said one side wall inserted in said slot with said inserting part, said inserting part including a holding lip which projects from an end of said inserting part obliquely outward, and a projection which projects from an upper part of an outside surface thereof, and said holding part being provided with a protrusion which protrudes from a lower end thereof toward said channel part, said one side wall defining said channel being inserted in said slot of said base portion, and said inserting part of said base portion being inserted in said channel such that said holding lip elastically contacts an other of said side walls defining said channel, whereby the weather strip is attached to one of the opening portion of the motor vehicle, and the periphery of the closing member for opening and closing the opening portion and when said inserting part becomes loose in said channel part, said protrusion engages with said channel part to prevent the weather strip from coming off said channel.

2. An attachment structure of a weather strip for a motor vehicle, which is to be attached to an opening portion of a motor vehicle, wherein the weather strip includes a base portion composed of a solid material and a tubular seal portion composed of a sponge material, and protruding from said base portion integrally therewith, the attachment structure comprising:

a channel part in which said base portion of the weather strip is adapted to be attached, said channel part having a U-shaped cross-section and including side walls provided in said opening portion of said motor vehicle, there defining a channel;

said base portion of the weather strip having a generally U-shaped cross-section to define a slot in which one of said side walls defining said channel is adapted to be inserted, said base portion including an inserting part which is adapted to be inserted in said channel, and a holding part for holding said one side wall inserted in said slot with said inserting part, said inserting part including a holding lip which projects from an end of said inserting part obliquely outward, said one side wall defining said channel being inserted in said slot of said base portion, and said inserting part of said base portion being inserted in said channel such that said holding lip elastically contacts an other of the side walls defining said channel, wherein the weather strip is a roof panel weather strip for sealing between a sliding roof provided in a roof panel, and an opening portion of the roof panel, said tubular seal portion protrudes from said holding part of said base portion of said roof panel weather strip toward said sliding roof, a frame member is provided in said opening portion for mounting said roof panel weather strip, said frame member includes a base part for securing said frame member to said opening portion, and said channel part has a U-shaped cross-section to define a channel for inserting said inserting part of said roof panel weather strip therein, said channel is defined by the side walls of said channel part, which are located on the side of said sliding roof and on the side of said opening portion, and said roof panel weather strip is attached such that one side wall of said channel part on the side of said sliding roof is inserted in said slot of said base portion and an end of said holding lip elastically contacts an inner surface of the other side wall of said channel part on the side of said opening portion.

3. The attachment structure of claim 1, wherein said holding lip further projects upward.

4. The attachment structure of claim 1, wherein the projection further projects outward.

5. The attachment structure of claim 1, wherein the solid material of the base portion is solid rubber.

6. The attachment structure of claim 2, wherein said holding lip further projects upward.

7. The attachment structure of claim 2, wherein the solid material of the base portion is solid rubber.

* * * * *